United States Patent

Close, Jr. et al.

[11] Patent Number: 5,749,303
[45] Date of Patent: May 12, 1998

[54] AUTO-RACK SIDESCREEN SECUREMENT APPARATUS FOR THE PREVENTION OF THEFT AND VANDALISM

[76] Inventors: John W. Close, Jr., 980 S. 72nd st., Suite 206, Omaha, Nebr. 68114; Martin L. Wulf, 19102 S. 156th St., Springfield, Nebr. 68059

[21] Appl. No.: 618,147

[22] Filed: Mar. 19, 1996

[51] Int. Cl.$^6$ .................................................. B61D 17/00
[52] U.S. Cl. .................................... 105/404; 105/355
[58] Field of Search ........................... 105/355, 404, 105/409, 411, 423, 401; 296/187, 191; 52/582.1, 582.4, 272, 266, 45, 56

[56] References Cited

U.S. PATENT DOCUMENTS

| | | | |
|---|---|---|---|
| 2,378,808 | 4/1945 | Brown | 52/584.1 |
| 4,409,906 | 10/1983 | Alneng | 52/584.1 |
| 4,913,061 | 4/1990 | Youngblood | 105/355 |
| 4,964,347 | 10/1990 | Long et al. | 105/355 |
| 5,112,099 | 5/1992 | Yurgevich et al. | 296/191 |
| 5,170,604 | 12/1992 | Hedly | 52/584.1 |
| 5,311,823 | 5/1994 | Rudibaugh et al. | 105/355 |
| 5,579,679 | 12/1996 | Burke | 105/355 |
| 5,584,527 | 12/1996 | Sitter | 296/191 |

FOREIGN PATENT DOCUMENTS

| | | | |
|---|---|---|---|
| 590025 | 6/1925 | France | 52/584.1 |
| 257528 | 3/1928 | Italy | 52/584.1 |

*Primary Examiner*—Mark T. Le
*Attorney, Agent, or Firm*—Henderson & Sturm

[57] ABSTRACT

A sidescreen securement apparatus for auto-rack railroad cars which may be installed by a single person working inside the car, thereby saving time and money, as well as eliminating the danger of falls. The sidescreen-roof securement device comprises a Y-shaped roof engagement member with a lower stem for securement to the sidescreen through one of its perforations with a blind fastener. A first sidescreen-sidescreen securement device takes advantage of the channels formed along the edges of the sidescreens. A channel segment slips into the edge channel of the upper sidescreen and is thereby secured to it. A U-shaped element is welded to the channel segment and a flange extends from the U-shaped member down to the adjacent lower sidescreen and is secured thereto by means of a blind fastener. An alternate sidescreen-sidescreen securement device may also be used to secure adjacent sidescreens and utilizes a U-shaped member having upper and lower flanges for engagement with the upper and lower sidescreens by means of blind fasteners.

14 Claims, 5 Drawing Sheets

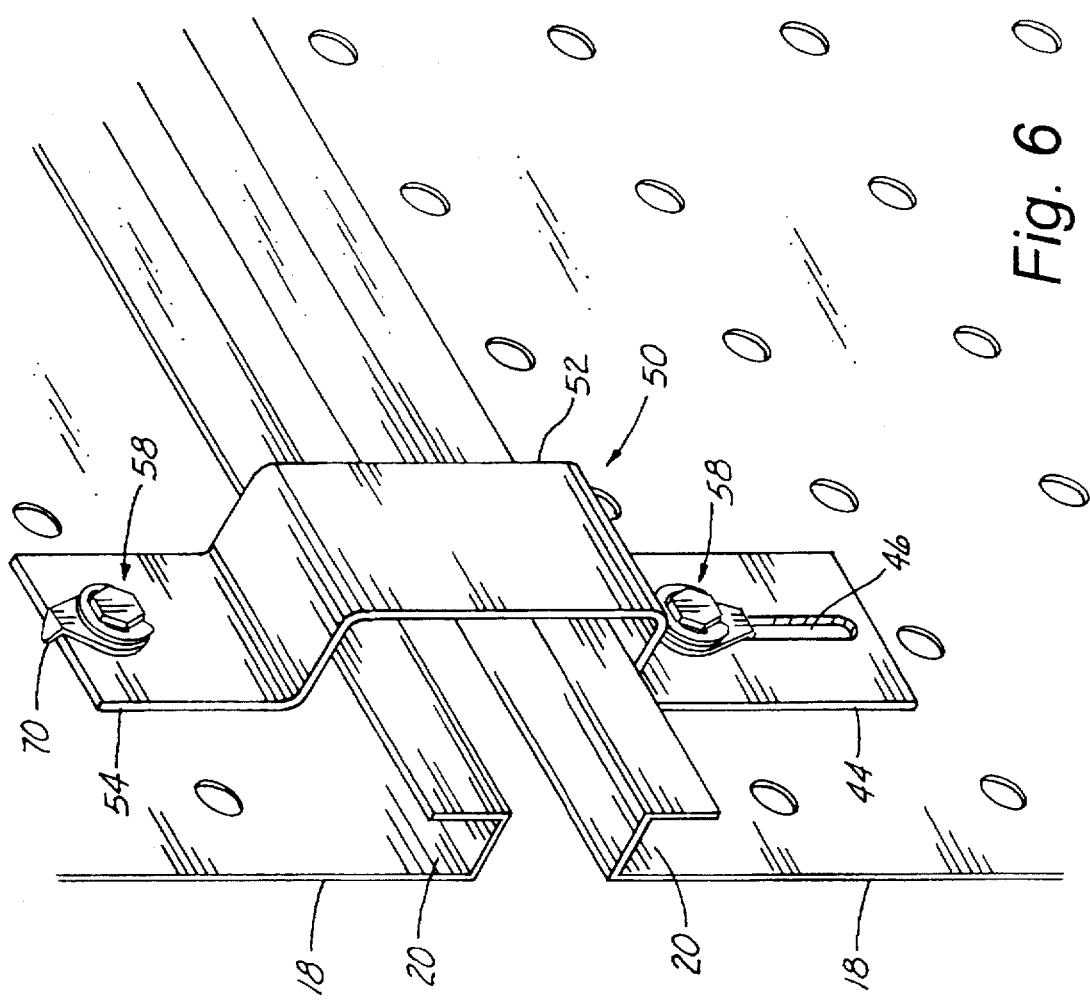

5,749,303

AUTO-RACK SIDESCREEN SECUREMENT APPARATUS FOR THE PREVENTION OF THEFT AND VANDALISM

TECHNICAL FIELD

The present invention relates to railroad equipment, and more particularly to an apparatus for the securement of sidescreens in auto-rack railroad cars for the prevention of vandalism and theft.

BACKGROUND ART

Auto-rack railroad cars are used in the railroad industry for the transportation of automobiles and trucks from the factories to distribution points and dealers. The most common of the auto-rack railroad cars can carry four vehicles on each of three tiers, for a total of twelve vehicles. The auto-rack railroad cars were originally open sided, but this configuration provided easy access to the vehicles for thieves and vandals when the cars were stopped, as well as an easy target for rocks when the cars were moving. To prevent this vandalism, sidescreens fabricated from perforated sheet metal were developed to enclose the railroad cars. These sidescreens are secured between the several vertical support beams on each side of the auto-rack cars. It soon became apparent that a means for securing adjacent sidescreens together, and for securing the uppermost sidescreen to the roof of the car, was necessary since vandals began using crowbars to force their way between the sidescreens and gain entry into the auto-rack cars. The standard method for securing adjacent sidescreens together has heretofore been to rivet a series of small steel plates between the sidescreens. Although effective, the process is extremely slow, labor intensive, and quite dangerous since it requires one worker to be inside the auto-rack car and a second worker, usually on a ladder, outside the car. The uppermost sidescreen is secured to the roof of the car in a similar manner using a series of double-L shaped plate pairs.

DISCLOSURE OF THE INVENTION

The present invention discloses a sidescreen securement apparatus for auto-rack railroad cars which may be installed by a single person working inside the car, thereby saving time and money, as well as eliminating the danger of falls. The sidescreen-roof securement device comprises a Y-shaped roof engagement member with a lower stem for securement to the sidescreen through one of its perforations with a blind fastener. A first sidescreen-sidescreen securement device takes advantage of the channels formed along the edges of the sidescreens. A channel segment slips into the edge channel of the upper sidescreen and is thereby secured to it. A U-shaped element is welded to the channel segment and a flange extends from the U-shaped member down to the adjacent lower sidescreen and is secured thereto by means of a blind fastener. An alternate sidescreen-sidescreen securement device may also be used to secure adjacent sidescreens and utilizes a U-shaped member having upper and lower flanges for engagement with the upper and lower sidescreens by means of blind fasteners.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 6 is a perspective view of an alternate sidescreen-sidescreen securement device of the invention.

BEST MODE FOR CARRYING OUT THE INVENTION

Figure 1:
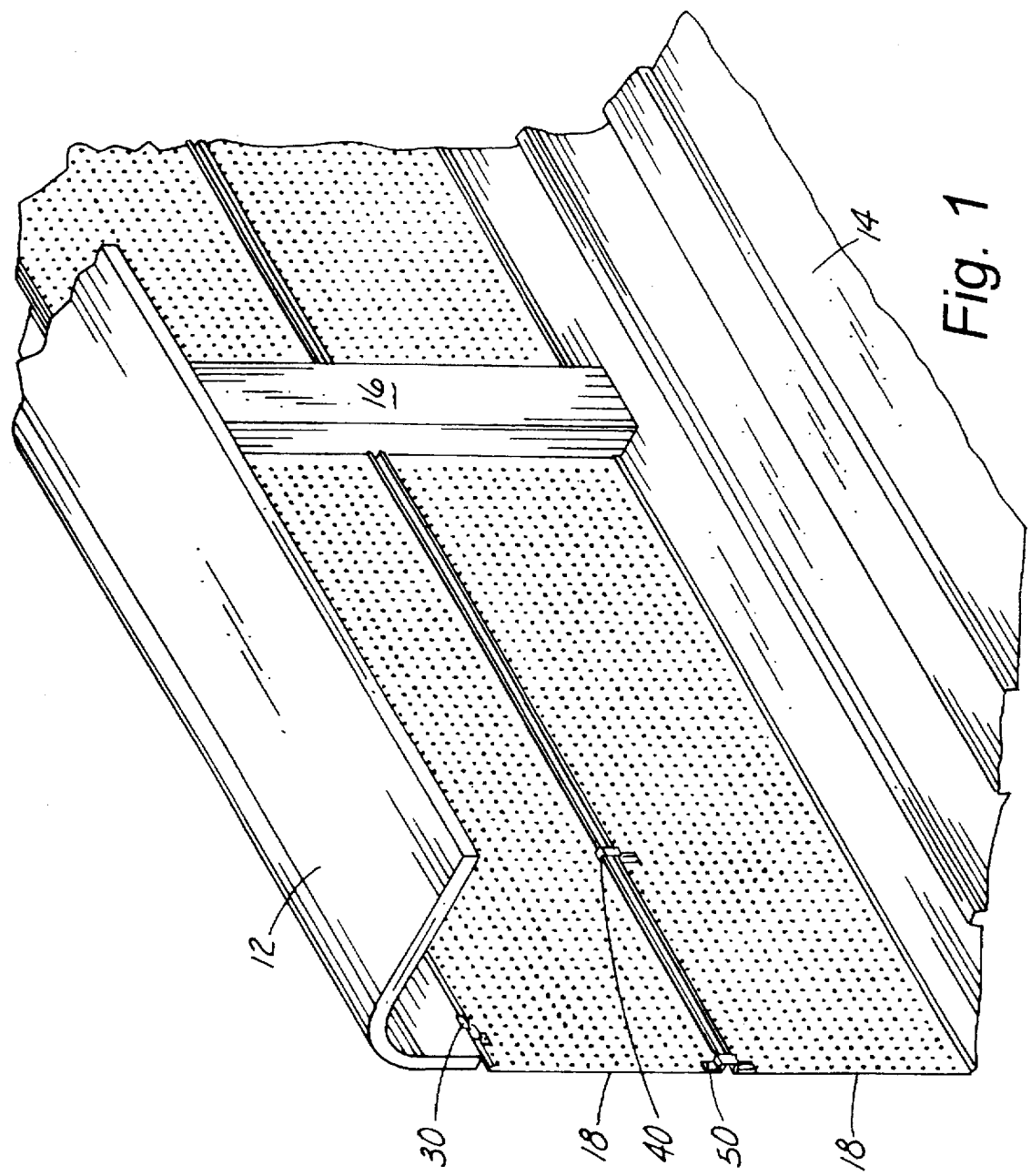
FIG. 1 is a perspective view showing the invention in place on the sidescreens of an auto-rack railroad car.

Referring now to the drawings, wherein like reference numerals designate identical or corresponding parts throughout the several views, a cutaway view of the interior of an auto-rack railroad car is shown in FIG. 1. The roof 12 of the car and the upper deck 14 are supported by a plurality of vertical support beams 16. A series of perforated sheet metal sidescreens 18 extend between, and are supported by, the vertical support beams 16.

The securement apparatus of the invention is depicted in FIG. 1 and is seen to comprise a sidescreen-roof securement device 30, a first sidescreen-sidescreen securement device 40, and a second sidescreen-sidescreen securement device 50. Although only one of each of the securement devices is shown in FIG. 1, in practice the devices are placed at intervals of approximately five feet along the sidescreens 18.

Figure 2:
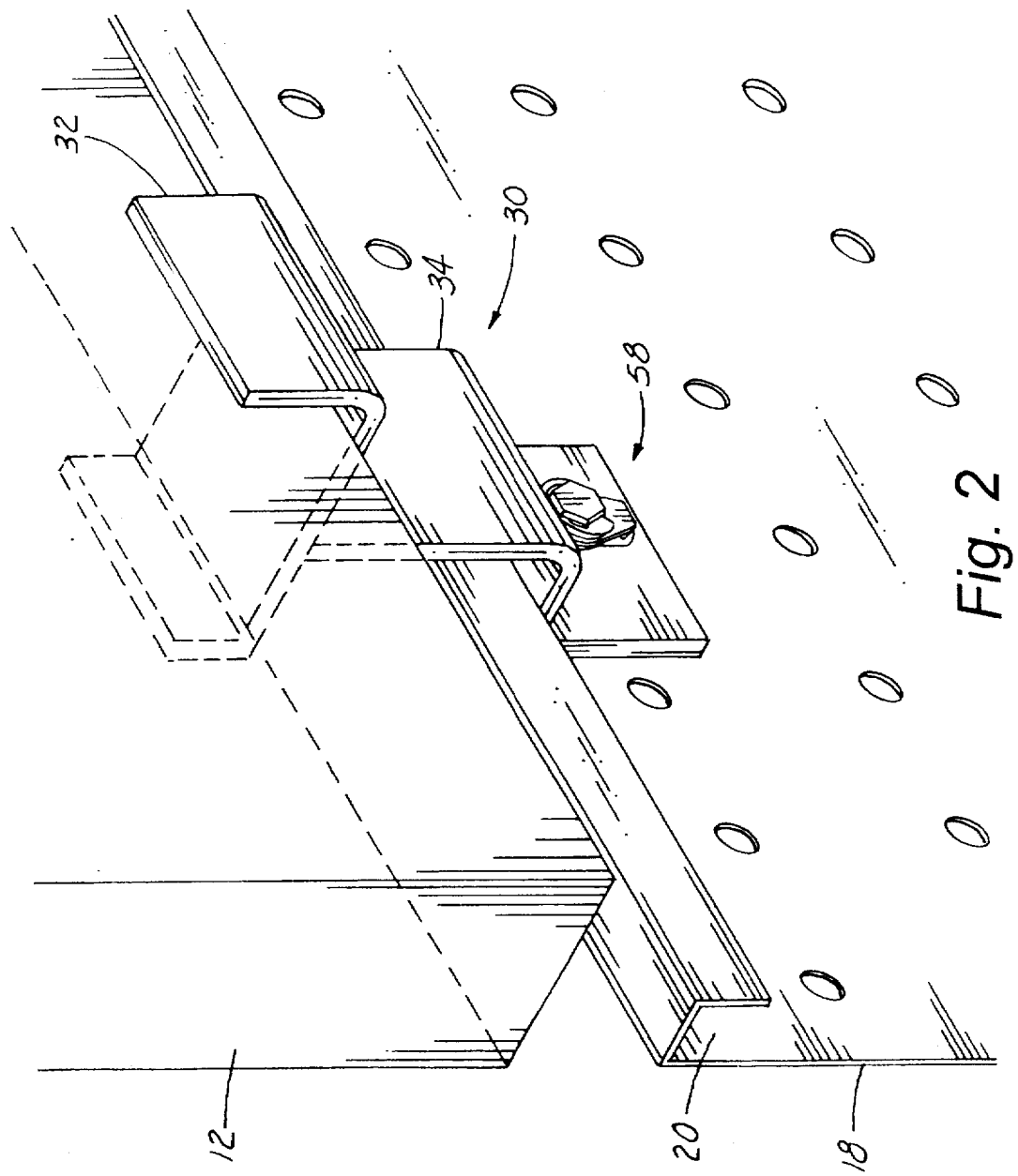
FIG. 2 is a perspective view, partially in phantom lines, showing the sidescreen-roof securement device of the invention.
Figure 3:
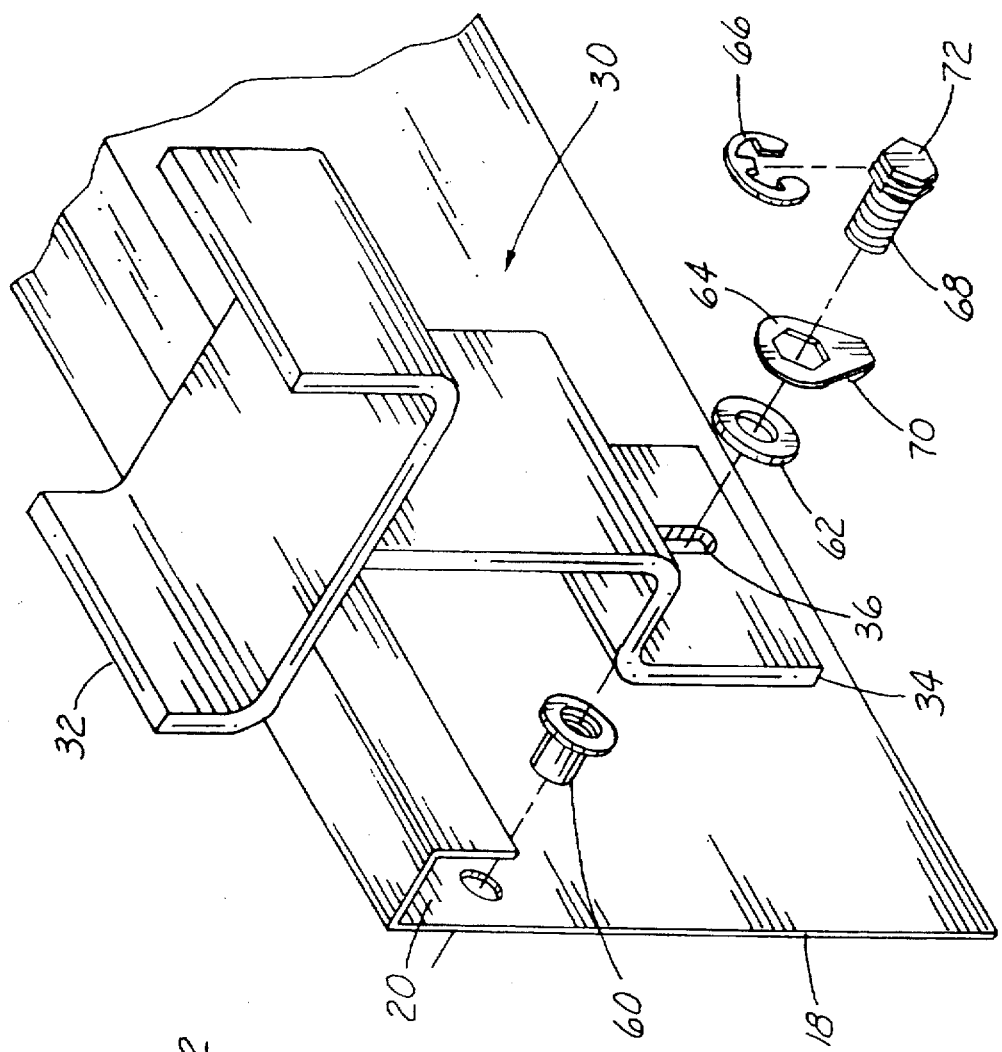
FIG. 3 is an exploded view of the sidescreen-roof securement device and attaching hardware of the invention.
Figure 4:
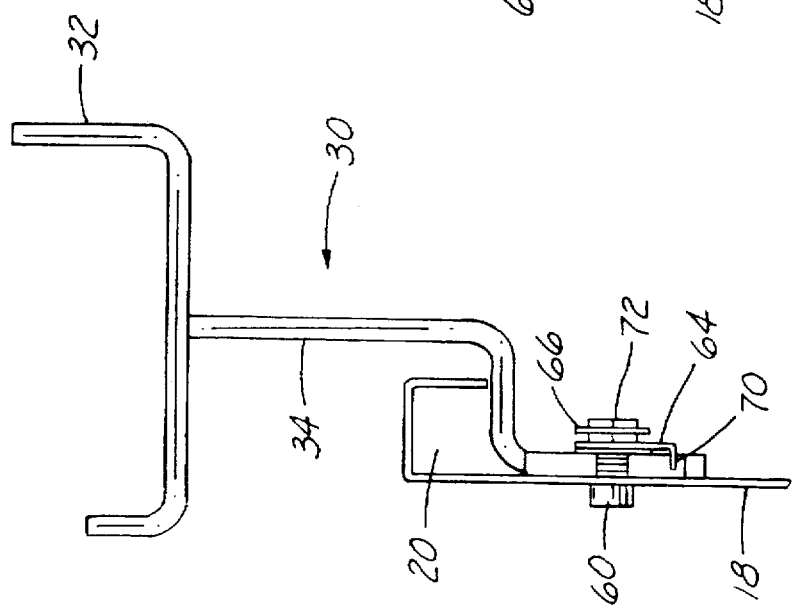
FIG. 4 is a sectional side view of the sidescreen-roof securement device in place on a sidescreen.

The sidescreen-roof securement device 30, preferably fabricated from steel, is shown in FIGS. 2, 3, and 4 and can be seen to comprise a Y-shaped upper member 32 welded to a lower stem 34. The Y-shaped upper member 32 is sized to captively engage the lower periphery of the roof 12 with the outer upwardly extending arm of the Y-shaped member 32 somewhat shorter than the inner arm to facilitate slipping it between the sidescreen 18 and the roof 12. The stem 34 is contoured to accommodate the edge channel 20 of the sidescreen 18.

Referring to FIGS. 3 and 4, a blind fastener 58 comprising a threaded insert 60, a washer 62, a lock tab 64, a lock tab clip 66, and a bolt 68 is used to affix the securement device 30 to the sidescreen 18. The threaded insert 60 is first placed within a hole in the perforated sidescreen 18 and is then crushed along its axis by means of a special crushing tool to securely engage the sidescreen 18. The washer 62 is placed on the bolt 68, which is then inserted through a slot 36 in the stem 34 and threaded into the insert 60. After the bolt 68 is tightened, the lock tab 64 is slipped over the head of the bolt 68 such that its tip 70 engages the slot 36 and thereby prevents rotation of the bolt 68. The lock tab clip 66 is then snapped onto the split-head 72 of the bolt 68 to hold the lock tab 64 in place.

Figure 5:
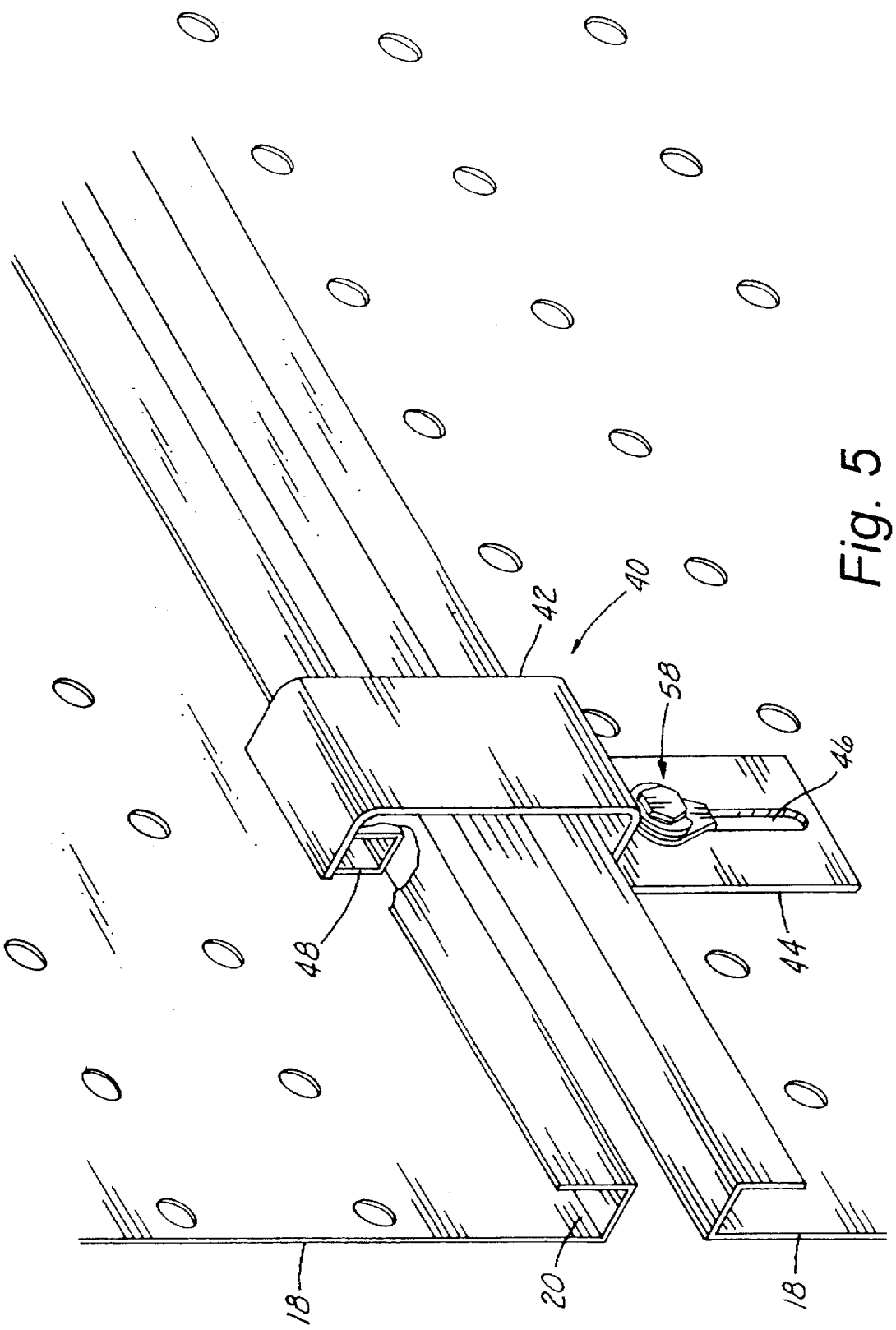
FIG. 5 is a partially cutaway, perspective view of the preferred sidescreen-sidescreen securement device of the invention.

A first embodiment of a sidescreen-sidescreen securement device 40 is shown in FIG. 5 and is seen to comprise a generally U-shaped member 42 with a lower sidescreen engagement flange 44 having a slot 46 for receipt of the blind fastener 58 as previously described. The upper side of the U-shaped member 42 has a downwardly depending square channel segment 48 welded thereto. The channel segment 48 slips into and engages the edge channel 20 of the upper sidescreen and the lower sidescreen engagement flange 44 is then secured to the lower sidescreen with a blind fastener 58.

A second embodiment of a sidescreen-sidescreen securement device 50 is shown in FIG. 6 and is seen to comprise a generally U-shaped member 52 having a lower sidescreen engagement flange 44 as well as an upper sidescreen engagement flange 54. The upper flange 54 utilizes a hole rather than a slot since only one side of the device needs to be adjustable. The tip 70 of the lock tab 64 engages the edge of the upper flange 54 to prevent the bolt 68 from turning.

Obviously, many modifications and variations of the present invention are possible in light of the above teachings. For example, it is envisioned that the invention may be fabricated from composite materials rather than steel. It is therefore to be understood that, within the scope of the appended claims, the invention may be practiced otherwise than as specifically described.

What is claimed is:

1. An auxiliary securement apparatus on an auto-rack railroad car having a roof, a plurality of vertical support beams, and a plurality of channel-edged sidescreens extending between the vertical support beams, wherein the securement apparatus comprises:

sidescreen-sidescreen securement means operatively engaging adjacent spaced locations on adjacent upper and lower sidescreens and located at a spaced location from said support beams, wherein the sidescreen-sidescreen securement means includes an elongate, contoured securement member having a lower portion adapted to engage the lower sidescreen, an upper portion adapted to engage the upper sidescreen, and a generally U-shaped portion dimensioned to accommodate adjacent edge channels of the upper and lower sidescreens; and blind fastener means for affixing said securement member to the interior of said sidescreens.

2. The auxiliary securement apparatus as recited in claim 1 wherein said generally U-shaped element is disposed in an overlapping manner with the upper portion and the lower portion.

3. An auxiliary securement apparatus for auto-rack railroad cars having a roof, a plurality of vertical support beams, and a plurality of sidescreens extending between the vertical support beams, wherein the securement apparatus comprises:

sidescreen-roof securement means for operatively engaging adjacent spaced locations on the uppermost sidescreen and the roof, wherein the sidescreen-roof securement means includes a generally Y-shaped securement member having an upper capture element dimensioned to captively surround the lower periphery of said roof, a lower stem element adapted to engage the uppermost sidescreen, and blind fastener means for affixing said lower stem element to the interior of said uppermost sidescreen.

4. The auxiliary securement apparatus as recited in claim 3 wherein the intermediate portion of the stem element is contoured to accommodate an edge channel of the sidescreen.

5. The auxiliary securement apparatus as recited in claim 3, and further comprising sidescreen-sidescreen securement means for operatively engaging adjacent spaced locations on adjacent upper and lower sidescreens, wherein the sidescreen-sidescreen securement means includes an elongate, contoured securement member having a lower portion adapted to engage the lower sidescreen, an upper portion adapted to engage the upper sidescreen, and a generally U-shaped portion dimensioned to accommodate adjacent edge channels of the upper and lower sidescreens; and blind fastener means for affixing said securement member to the interior of said sidescreens.

6. The auxiliary securement apparatus as recited in claim 5 wherein said generally U-shaped element is disposed in an overlapping manner with the upper portion and the lower portion.

7. The auxiliary securement apparatus as recited in claim 5 wherein the generally U-shaped element is further provided on its upper end with a downwardly depending channel segment dimensioned to be received in an upper sidescreen edge channel.

8. An auxiliary securement apparatus for auto-rack railroad cars having a roof, a plurality of vertical support beams, and a plurality of channel-edged sidescreens extending between the vertical support beams, wherein the securement apparatus comprises:

(a) sidescreen-sidescreen securement means for operatively engaging adjacent spaced locations on adjacent upper and lower sidescreens, wherein the sidescreen-sidescreen securement means includes an elongate, contoured securement member having a lower portion adapted to engage the lower sidescreen, an upper portion adapted to engage the upper sidescreen, and a generally U-shaped portion dimensioned to accommodate adjacent edge channels of the upper and lower sidescreens;

(b) sidescreen-roof securement means for operatively engaging adjacent spaced locations on the uppermost sidescreen and the roof, wherein the sidescreen-roof securement means includes a generally Y-shaped securement member having an upper capture element dimensioned to captively surround the lower periphery of said roof, a lower stem element adapted to engage the uppermost sidescreen; and (c) blind fastener means for affixing said securement means to the interior of said sidescreens.

9. The auxiliary securement apparatus as recited in claim 8 wherein said generally U-shaped element is disposed in an overlapping manner with the upper and the lower portion.

10. The auxiliary securement apparatus as recited in claim 8 wherein the generally U-shaped element is further provided on its upper end with a downwardly depending channel segment dimensioned to be received in an upper sidescreen edge channel.

11. The auxiliary securement apparatus as recited in claim 8 wherein the intermediate portion of the stem element is contoured to accommodate an edge channel of the sidescreen.

12. An auxiliary securement apparatus for auto-rack railroad cars having a roof, a plurality of vertical support beams, and a plurality of channel-edged sidescreens extending between the vertical support beams, wherein the securement apparatus comprises:

sidescreen-sidescreen securement means for operatively engaging adjacent spaced locations on adjacent upper and lower sidescreens, wherein the sidescreen-sidescreen securement means includes an elongate, contoured securement member having a lower portion adapted to engage the lower sidescreen, an upper portion adapted to engage the upper sidescreen, and a generally U-shaped portion dimensioned to accommodate adjacent edge channels of the upper and lower sidescreens and disposed in an overlapping manner with the upper portion and the lower portion, said U-shaped element provided on its upper side with a downwardly depending channel segment dimensioned to be received in an upper sidescreen edge channel; and blind fastener means for affixing said securement member to the interior of said sidescreens.

13. The auxiliary securement apparatus as recited in claim 12, and further comprising sidescreen-roof securement means for operatively engaging adjacent spaced locations on the uppermost sidescreen and the roof, wherein the sidescreen-roof securement means includes a generally Y-shaped securement member having an upper capture element dimensioned to captively surround the lower periphery of said roof, a lower stem element adapted to engage the uppermost sidescreen, and blind fastener means for affixing said lower stem element to the interior of said uppermost sidescreen.

14. The auxiliary securement apparatus as recited in claim 13 wherein the intermediate portion of the stem element is contoured to accommodate an edge channel of the sidescreen.

* * * * *